United States Patent
Cavallaro, III et al.

(10) Patent No.: US 8,820,599 B2
(45) Date of Patent: *Sep. 2, 2014

(54) METHOD AND APPARATUS FOR REMOVING PERIPHERAL PORTION OF A GLASS SHEET

(75) Inventors: Nicholas Dominic Cavallaro, III, Painted Post, NY (US); Keith Mitchell Hill, Horseheads, NY (US); Harry J Reidy, Horseheads, NY (US); Liming Wang, Painted Post, NY (US); Zheming Zheng, Horseheads, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 236 days.

This patent is subject to a terminal disclaimer.

(21) Appl. No.: 13/307,478

(22) Filed: Nov. 30, 2011

(65) Prior Publication Data

US 2013/0134199 A1    May 30, 2013

(51) Int. Cl.
*B26F 3/00*    (2006.01)

(52) U.S. Cl.
USPC ............... 225/2; 225/96; 225/96.5; 225/105

(58) Field of Classification Search
USPC ................... 225/2, 96, 96.5, 103–106
See application file for complete search history.

(56) References Cited

FOREIGN PATENT DOCUMENTS

JP    2011190039    9/2011    ........... B65G 40/06

*Primary Examiner* — Omar Flores Sanchez
(74) *Attorney, Agent, or Firm* — Kevin M. Able; William J. Tucker; Matthew J. Mason

(57) ABSTRACT

Process for removing peripheral portions such as bead regions of a glass sheet including a step of pushing the glass sheet in the peripheral portion using a pushing mechanism such as a pushing bar, and corresponding apparatus. As a result of the use of the pushing mechanism, the engagement completion time for suction cups, if used, are reduced significantly. A process without using suction cups is enabled with enhanced yield. The increased process stability and enlarged process window are particularly advantageous for processing glass sheets having high flexibility.

21 Claims, 5 Drawing Sheets

METHOD AND APPARATUS FOR REMOVING PERIPHERAL PORTION OF A GLASS SHEET

FIELD

The present invention relates to method and apparatus for glass sheet periphery finishing. In particular, the present invention relates to method and apparatus for removing a peripheral portion of a glass sheet. The present invention is useful, e.g., for removing the bead regions of a glass sheet formed from a down-draw process for use as glass substrates for displays.

TECHNICAL BACKGROUND

Thin glass sheets have found use in many optical, electronic or optoeletronic devices, such as liquid crystal displays (LCD), organic light-emitting diode (OLED) displays, solar cells, as semiconductor device substrates, color filter substrates, cover sheets, and the like. The thin glass sheets, having a thickness from several micrometers to several millimeters, may be fabricated by a number of methods, such as float process, fusion down-draw process (a method pioneered by Corning Incorporated, Corning, N.Y., U.S.A.), slot down-draw process, and the like.

In many of the applications of thin glass sheets, it is highly desired that the glass sheets have (i) pristine surface quality essentially free of scratches, particles, and other defects; (ii) high thickness uniformity; (iii) low surface roughness and waviness. To that end, in the forming process for making the glass sheets, typically direct contact of the center region of major surfaces of the as-formed glass sheet with solid surfaces is avoided. Instead, only the peripheral region of the glass sheet was subjected to direct contact with solid surfaces such as edge rolls, pulling rolls, edge guiding rolls, and the like. Thus, the peripheral portions of both sides of an as-formed glass sheet obtained directly from the forming device, such as in the bottom-of-draw area of a fusion down-draw or slot down-draw process, sometimes called "beads," tend to have lower surface quality than the center region of the major surfaces. In addition, depending on the specific forming device used, the peripheral portions tend to have different thickness and significantly higher thickness variation than the center region.

Various glass sheet bead removal technologies were used or proposed previously with different yield, yield consistency, and cost of the processes and equipment.

The display market has shown increasing demand for glass sheets with high flexibility, i.e., those with large sheet width and/or length, and/or very small thickness. The present inventors have found that, for glass sheets with high flexibility, bead removal can be a significant challenge and an overall yield bottleneck in a glass sheet manufacture process. Thus, an acceptable bead removal process for a glass sheet with relatively low flexibility may be unacceptable for a glass sheet with significantly higher flexibility.

Thus, there is a genuine need of a robust glass sheet bead removal process with acceptable capability for glass sheets with high and/or low flexibility. The present invention satisfies this and other needs.

SUMMARY

Several aspects of the present invention are disclosed herein. It is to be understood that these aspects may or may not overlap with one another. Thus, part of one aspect may fall within the scope of another aspect, and vice versa.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa.

Thus a first aspect of the present disclosure is a process for removing a first peripheral portion of a glass sheet, comprising the following steps:

(I) providing a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion in the vicinity of the first side edge surface;

(II) placing the glass sheet in a predetermined position by securing the first and second major surfaces in the vicinity of the upper edge surface to a suspension device;

(III) after step (II), restraining the first and second major surfaces in the vicinity of the first side edge at a distance D1 from the end of the first side edge surface extending from the upper edge surface to the lower edge surface;

(IV) after step (III), forming a score-line on the first major surface extending from the vicinity of the upper edge surface to the vicinity of the lower edge surface at a distance from the end of the first side edge surface D2, where D2<D1;

(V) clamping the first and second major surfaces in the vicinity of the first side edge at a distance D3 from the end of the first side edge surface using a first pair of clamps;

(VI) contacting the second major surface with a nosing strip opposing the score-line;

(VII) after steps (V) and (VI), moving the second major surface in a direction away from the first major surface by the first pair of clamps, such that the first peripheral portion of the glass sheet in the vicinity of the first side edge bends against the nosing strip, and separates along the score-line from the center region of the glass sheet.

In certain embodiments of the first aspect of the present disclosure, in all steps (II) to (VII), the glass sheet is held substantially vertical.

In certain embodiments of the first aspect of the present disclosure, step (III) precedes step (V).

In certain embodiments of the first aspect of the present disclosure, steps (III) and (V) are carried out substantially simultaneously.

In certain embodiments of the first aspect of the present disclosure, in step (V), the first pair of clamps are substantially vertical, i.e., substantially parallel to the gravity acceleration vector.

In certain embodiments of the first aspect of the present disclosure, in step (I), the first peripheral portion of the glass sheet as provided is warped in the direction from the upper edge surface to the lower edge surface when the glass sheet has a substantially uniform temperature at room temperature and is not subjected to external force.

In certain embodiments of the first aspect of the present disclosure, in step (VI), the engagement of the first pair of clamps to the first major surface and the second major surface of the first peripheral portion is completed in at most 1.5 seconds, in certain embodiments in at most 1 second, in certain other embodiments in at most 0.5 second, in certain other embodiment in at most 0.4 second, in certain other embodiments in at most 0.3 second.

In certain embodiments of the first aspect of the present disclosure, in step (II), the first and second major surfaces in the vicinity of the upper edge surface are secured to a suspension device by using clamps.

In certain embodiments of the first aspect of the present disclosure, in step (III), the first and second major surfaces in the vicinity of the first side edge are secured by a second vertical pair of clamps at a distance D1 from the end of the first side edge surface.

In certain embodiments of the first aspect of the present disclosure, the second vertical pair of clamps extends from the upper edge surface to the lower edge surface.

In certain embodiments of the first aspect of the present disclosure, step (VI) precedes step (IV), and in step (IV), a mechanical score wheel is used to press against the first major surface and form the score-line.

In certain embodiments of the first aspect of the present disclosure, in step (I), the center thickness Th(C) of the glass sheet is at most 500 µm, in certain embodiments at most 400 µm, in certain embodiments at most 300 µm, in certain other embodiments at most 200 µm, in certain other embodiments at most 100 µm.

In certain embodiments of the first aspect of the present disclosure, in step (I), the glass sheet has a height of at least 1000 cm, in certain embodiments at least 1200 cm, in certain other embodiments at least 1500 cm, in certain other embodiments at least 1800 cm, in certain other embodiments at least 2000 cm, in certain other embodiments at least 2500 cm, in certain other embodiments at least 3000 cm. As used herein, the height of a glass sheet is defined as the shortest distance from the upper edge surface to the lower edge surface.

In certain embodiments of the first aspect of the present disclosure, in step (I), the glass sheet has a width of at least 1000 cm, in certain embodiments at least 1200 cm, in certain other embodiments at least 1500 cm, in certain other embodiments at least 1800 cm, in certain other embodiments at least 2000 cm, in certain other embodiments at least 2500 cm, in certain other embodiments at least 3000 cm. As used herein, the width of a glass sheet is defined as the shortest distance from the end of the first side edge surface to the end of the second side edge surface.

In certain embodiments of the first aspect of the present disclosure, the glass sheet is made by a down-draw process such as a fusion down-draw, a slot down-draw or a redraw down-draw process.

In certain embodiments of the first aspect of the present disclosure, in step (IV), the score-line is formed by using a laser beam.

In certain embodiments of the first aspect of the present disclosure, 5 cm$\leq$D1$\leq$50 cm, in certain embodiments 5 cm$\leq$D1$\leq$40 cm, in certain embodiments 5 cm$\leq$D1$\leq$30 cm, in certain embodiments 5 cm$\leq$D1$\leq$20 cm, in certain embodiments 5 cm$\leq$D1$\leq$15 cm, in certain other embodiments 5$\leq$D1$\leq$10 cm.

In certain embodiments of the first aspect of the present disclosure, 4 cm$\leq$D2<40 cm, in certain embodiments 4 cm$\leq$D2$\leq$40 cm, in certain embodiments 4 cm$\leq$D2$\leq$30 cm, in certain embodiments 4 cm$\leq$D2$\leq$20 cm, in certain embodiments 4 cm$\leq$D2$\leq$15 cm, in certain other embodiments 4 cm$\leq$D2$\leq$10 cm.

In certain embodiments of the first aspect of the present disclosure, 0.5 cm$\leq$D3$\leq$20 cm, in certain embodiments 0.5 cm$\leq$D3$\leq$15 cm, in certain embodiments 0.5 cm$\leq$D3$\leq$10 cm, in certain embodiments 0.5 cm$\leq$D3$\leq$8 cm, in certain embodiments 0.5 cm$\leq$D3$\leq$5 cm, in certain other embodiments 0.5 cm$\leq$D3$\leq$3 cm.

In certain embodiments of the first aspect of the present disclosure, in step (V), the first pair of clamps extends from the upper edge surface to the lower edge surface.

In certain embodiments of the first aspect of the present disclosure, in step (V), the first pair of clamps exert a pressure to the first and second major surfaces of the glass sheet ranging from 200 to 2000 pascal, in certain embodiments from 300 to 1500 pascal, in certain other embodiments from 400 to 1000 pascal, in certain other embodiments from 500 pascal to 1000 pascal. For example, for a glass sheet having a height of about 1900 mm, when the clamp strips of the first pair of clamps have a width of about 2 mm, the desired force applied by the clamps to the the first and second major surfaces can vary from 2 pound force (4.45 newton) to about 20 pound force (44.5 newton).

In certain embodiments of the first aspect of the present disclosure, the suspension device in step (II) is part of a glass conveying device.

In certain embodiments of the first aspect of the present disclosure, step (IV) precedes step (VI).

In certain embodiments of the first aspect of the present disclosure, step (VI) precedes step (IV).

In certain embodiments of the first aspect of the present disclosure, in step (VI), the nosing strip has a hardness not lower than the glass sheet. In certain embodiments, the nosing strip has a Shore A hardness of at least 40, in certain embodiments at least 50, in certain other embodiments at least 60.

In certain embodiments of the first aspect of the present disclosure, in step (VI), the nosing strip is mounted on a support that is sufficiently rigid such that during step (IV), the nosing strip remains substantially linear when the score wheel presses the first major surface of the glass against the nosing strip.

A second aspect of the present disclosure is directed to an apparatus for removing a first peripheral portion of a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion in the vicinity of the first side edge surface, comprising the following:

(A) a glass suspension device adapted for placing the glass sheet in a vertical position by securing the first and second major surfaces in the vicinity of the upper edge surface;

(B) a first edge restraining tower located on the side of the first major surface comprising a first edge restraining clamp strip, and a second edge restraining tower located on the side of the second major surface comprising a second edge restraining clamp strip, the distance between the first edge restraining clamp strip and the second edge restraining clamp strip being adjustable and adapted for restraining the first and second major surfaces in the vicinity of the first side edge at a distance D1 from the end of the first side edge surface from the upper edge surface to the lower edge surface;

(C) a mechanical scoring wheel installed on the first edge restraining tower adapted for vertical motion in contact with the first major surface to form a score-line on the first major surface extending from the vicinity of the upper edge surface to the lower edge surface at a distance from the end of the first side edge surface D2, where D2<D1;

(D) a first pair of edge clamps adapted for engaging and clamping the first and second major surfaces of the first peripheral portion at a distance from the end of the first side edge surface D3, where D3<D2;

(E) a nosing strip opposing the score-line adapted for contacting the second major surface; and (F) a force applicator adapted for moving the second major surface in a direction away from the first major surface by the first pair of clamps, such that the first peripheral portion of the glass sheet in the vicinity of the first side edge bends against the nosing strip, and separates along the score-line from the center region of the glass sheet.

In certain embodiments of the second aspect of the present disclosure, the nosing strip has a hardness not lower than the glass sheet.

In certain embodiments of the second aspect of the present disclosure, the nosing strip is supported by a seat that is sufficiently rigid such that the nosing strip remains substantially linear when the score wheel presses the first major surface of the glass against the nosing strip.

In certain embodiments of the second aspect of the present disclosure, the nosing strip comprises a material selected from aluminum, steel, copper and alloys thereof, and polyimide.

In certain other embodiments of the second aspect of the present disclosure,

One or more embodiments and/or aspects of the present disclosure have the following advantages. First, by using the first pair of clamps to restrain the first and second major surfaces in the vicinity of the first side edge at a distance D3 from the end of the first side edge surface before the score-line is formed, the motion of the first peripheral portion of the glass sheet is significantly reduced during scoring, thereby the reliability of the formation of the score-line and its quality are substantially increased for thin glass sheets having a thickness $Th(C)$ at most 500 μm, especially those having a thickness $Th(c)$ at most 300 μm, and even more advantageous for those having a thickness $Th(C)$ at most 200 μm. Accordingly, the overall yield of the peripheral removal process is significantly improved. Second, due to the additional restraining provided by the first pair of clamps, the process and apparatus are less sensitive to sheet warp from the upper to the lower edge surfaces, thus capable of handling glass sheets with high flexibility and relatively large sheet warp, such as those with a thickness at most 500 μm, at most 400 μm, at most 300 μm, or even at most 200 μm.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION

As mentioned supra, the process and apparatus of the present disclosure are particularly advantageous for removing the bead regions of a glass sheet, and as such, will be subsequently illustrated in the context of bead region removal. However, one having ordinary skill in the art should readily appreciate that, upon reading the specification of the present application and with the benefit of the teachings herein, the process and apparatus of the present disclosure may be used for removing a peripheral portion of any glass sheet, which may or may not be a region comprising a bead. For example, the process and apparatus as disclosed herein can be used to resize a glass sheet without a bead region.

For the convenience of description, a glass sheet is a piece of glass material having two major surfaces i.e., a first major surface and a second major surface, with a width, a length, and a thickness defined as the distance from the first major surface to the second major surface. The first and second major surfaces are connected, at four sides, by an upper edge surface, a lower edge surface, a first side edge surface and a second side edge surface. The upper edge surface, the lower edge surface, the first side edge surface and the second side edge surface may be substantially planar or curved. Where an edge surface is curved, it would extend, in the direction from the end of the edge surface to the centerline of the glass sheet, for a distance of at most 1 cm before it is connected with the first and/or the second major surfaces.

For the convenience of description, the various steps of the processes in accordance with various aspects and embodiments of the present disclosure are numbered as (I), (II), ... (VIII), and the like. It is to be understood that, unless specifically indicated otherwise or the context indicates to the contrary, the steps can be carried out in any order.

Figure 1A:
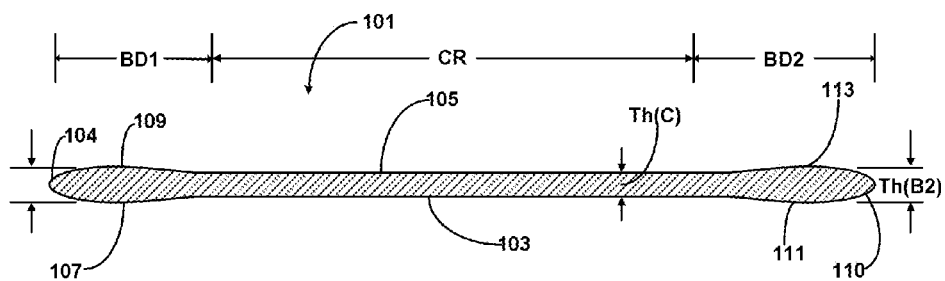
FIGS. 1A and 1B are schematic illustrations of the cross-sectional view and front view of a glass sheet comprising a center region and two bead regions that may be subjected to peripheral portion removal according to the present disclosure.
Figure 1B:
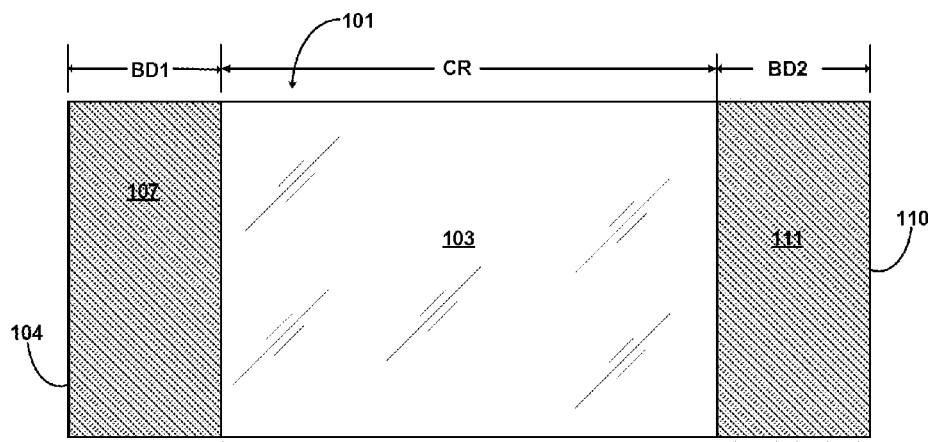

FIG. 1A schematically illustrates the cross-sectional view of a glass sheet 101 formed at the bottom-of-the-draw by a fusion down-draw process intercepted by a plane substantially perpendicular to the first and second major surfaces. This glass sheet 101 can be advantageously finished using the apparatus and method of the present disclosure. The glass sheet 101 has: a first major surface 103; a second major surface 105; a curved first side edge surface 104 having an end with the largest distance from the center line of the first major surface, and a curved second side edge surface 110 having an end with the largest distance from the center line of the first major surface, each connecting the first major surface 103 and the second major surface 105, respectively. The glass sheet 101 comprises a center region (CR) having a substantially uniform thickness $Th(C)$, a first bead region BD1 corresponding and adjacent to the first side edge surface 104, having a curved first bead surface 107 and a curved second bead surface 109 on each side of the glass sheet, and a second bead region BD2 corresponding and adjacent to the second side edge surface 110, having a curved third bead surface 111 and a curved fourth bead surface 113. The maximal thickness of the first bead region BD1, defined as the maximal thickness thereof when intercepted by virtual planes perpendicular to a flattened first major surface 103 and/or second major surface 105 in the center region, is Th(B1). The second bead region BD2 has a maximal thickness Th(B2), which may be substantially the same or different from Th(B1). Likewise, the first bead region BD1 and the second bead region BD2 may have the same or different width. FIG. 1B schematically illustrates the front view of the same glass sheet when viewed in the direction from the first major surface 103 to the second major surface 105.

The center region CR of the glass sheet with high, pristine surface quality, is sometimes called quality region. Normally, in the process of manufacturing an electronic/optic device based on a glass substrate, functional devices, such as semiconductor devices, other electronic devices and optical devices, and the like, are formed on a major surface of the glass sheet only after the first and second bead regions are removed. After removal of both edge portions, the glass sheet may be then subjected to edge finishing such as grinding and polishing, followed by cleaning and drying, before functional devices such transistors and the like are deposited on the quality area CR of one or two of the first and second major surfaces.

As used herein, a first peripheral portion of a glass sheet is a portion thereof corresponding to and in the vicinity of the first side edge surface intended to be removed from the rest of the glass sheet. The center region of the glass sheet is normally the portion thereof intended to be retained and used for a subsequent application. Referring to FIGS. 1A and 1B, the first peripheral portion of the glass sheet 101 advantageously corresponds to the first bead region BD1. Below the present invention is described and illustrated with respect the first peripheral portion only. However, one having ordinary skill in the art, having benefited from the disclosure herein upon reading the present disclosure, should readily appreciate that the in a real glass sheet peripheral portion finishing process, either or both of the first peripheral portion and the second peripheral portion may be processed according to the various aspects and embodiments of the process of the present disclosure using an apparatus according to various aspects and embodiments of the present disclosure. Indeed, it is also possible that the peripheral portions of the glass sheet adjacent to the upper edge surface and the lower edge surface may be processed in substantially the same manner as the first peripheral portion upon a 90° rotation of the glass sheet. Such processing of multiple peripheral portions of the glass sheet can be carried out sequentially or simultaneously. In certain specifically advantageous embodiments, the first and second peripheral portions of the same glass sheet may be processed substantially simultaneously in a substantially synchronized and symmetric manner.

In step (II), the glass sheet 101 is placed in a predetermined position, such as a substantially horizontal position where the gravitational acceleration vector is substantially perpendicular to a flattened first major surface 103, or a substantially vertical position where the gravitational acceleration vector is substantially parallel to the first major surface 103 of the glass sheet 101. It is highly desired that, during all steps (II) to (VII), the position of the glass sheet is substantially stable, i.e., the angle between the gravitational acceleration vector and the first major surface does not vary more than 10°, in certain embodiments not more than 8°, in certain other embodiments not more than 6°, in certain other embodiments not more than 5°, in certain other embodiments not more than 4°, in certain embodiments not more than 3°, in certain other embodiments not more than 2°. The placing of the glass sheet into the predetermined position is advantageously effected by restraining the first and second major surfaces in the vicinity of the upper edge surface to a suspension device. In a particularly advantageous embodiment, the glass sheet is placed in a substantially vertical position, i.e., the first and/or second major surfaces of the glass sheet are oriented at a angle of at most 10°, in certain embodiments at most 8°, in certain other embodiments at most 6°, in certain other embodiments at most 4°, in certain other embodiments at most 2°, in certain other embodiments at most 1°, relative to the gravitational acceleration vector.

A relatively large glass sheet with a relatively thin thickness made in a real glass sheet manufacture process, such as a fusion down-draw process, a float process or a slot down-draw process, will exhibit a natural curvature, sometimes called "warp," if it has a substantially uniform temperature around the room temperature in a gravity-free environment, due to the presence of various level of internal stress distributed in the glass sheet as a result of the unique mechanical and/or thermal history the glass sheet has been subjected to. For example, in a typical fusion down-draw process, the glass sheet is formed by drawing a viscous glass ribbon formed at the root of a forming device called isopipe into desired width and thickness while cooling it to a viscoelastic state, and eventually elastic state. Mechanical rollers contact the peripheral portion, called beads, while the glass ribbon is being drawn-down. Discrete glass sheets are then cut from a continuous glass ribbon, normally with the beads remaining in place, and finally cooled to around room temperature. The glass material in the glass sheet was subjected to slightly different thermal history from one side to the other, and from the top to the bottom. For example, the bead region of the glass ribbon normally has a larger thickness, and therefore would normally cool down at a slower rate compared to the thinner, center region, in the same cooling environment. The differential thermal history causes internal residual stress in the glass sheet when the glass sheet is at a substantially uniform temperature at around room temperature.

Figure 5:
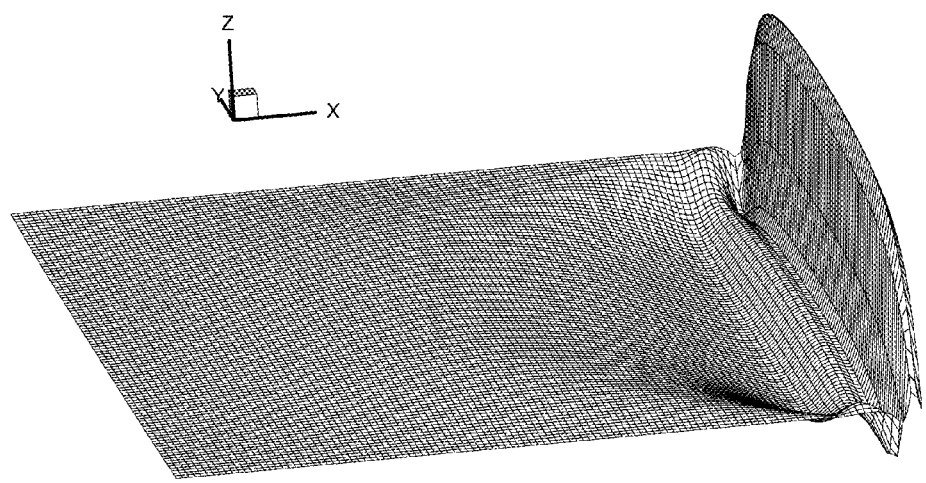
FIG. 5 is a diagram showing residual stress distribution in a glass sheet having a bead region before preferential bead heating.

FIG. 5 is a diagram showing the stress distribution profile of a part of an exemplary glass sheet made by a fusion down-draw process. Shown on the horizontal axis is distance from the centerline of the glass sheet, and on the vertical axis is the distance from the upper edge of the sheet. The rightmost peripheral portion comprising a bead exhibits the highest stress of up to 3225 psi, while the center region has substantially zero stress. This residual stress distribution profile can impart a curvature to the glass sheet, sometimes called warp, as mentioned supra. The warp will be three-dimensional in nature: it will be present vertically from the upper edge surface, and horizontally from the first side edge surface to the second side edge surface.

When a glass sheet exhibits a natural warp in a gravity-free environment, it will normally exhibit a natural warp if it is hung from the upper edge in the gravity field if no further external restraint is imposed to counteract the internal stress. The presence of the residual stress inside the glass sheet and the natural curvature of the glass sheet, when hung at a vertical position, make the removal of the peripheral portion such as the bead region difficult. The methods and apparatuses of the present disclosure are particularly advantageous for removing the peripheral portions of such glass sheet that would normally exhibit a gravity-free warp when at a substantially uniform temperature around room temperature, for reasons to be explained in greater detail and depth infra.

As mentioned supra in the context of a fusion down-draw forming process, in any glass forming process involving a drawing operation of the glass material at a viscous state, normally the glass is restrained at the edge area by, e.g., a pair of rollers pinching both sides of the peripheral portion. The direct contact between the glass and the roller at higher temperature and low glass viscosity would result in the formation of a knurled surface in the bead region. Normally, the bead region tends to have a varying thickness profile. For example, FIG. 1A shows a beaded regions BD1 and BD2 having maximal thicknesses Th(B1) and Th(B2) appreciably larger than the thickness of the center region, Th(C). Normally, between the region having a knurled surface and the quality center region having a substantially uniform thickness Th(C), there exists an intermediate region that has a substantially smooth surface due to lack of direct contact with an edge roller, but a varying thickness profile not as uniform as that of the center region. The combination of the region having the curved edge surface 104, the region with knurled surface, and the region with a substantially smooth surface and a varying thickness profile, constitutes the first peripheral portion subjected to removal by using the process and apparatus according to the present disclosure. In the past, suction cups are directly engaged with the second section, i.e., the section with smooth surfaces, but not the first section, i.e., the section with knurled surface, to ensure leak-free and robust contact and reduce the engagement completion time for the suction cups, during the bead region removal process.

In the process according to the first aspect of the present disclosure, as a result of the inclusion of step (V), i.e., the step of clamping the first and second major surfaces in the vicinity of the first side edge at a distance D3 from the end of the first side edge surface using a first pair of clamps, where D3<D2, the engagement of the clamps to the first and second major surface of the glass sheet is greatly facilitated compared with a process where suction cups are used instead to restrain the glass sheet. Compared to a process utilizing suction cups in place of the first pair of clamps, the process of the present disclosure in certain embodiments reduces the engagement completion time by at least ¼, in certain embodiments by at least ⅓, in certain other embodiments by at least ½. In the past, where suction cups are used to restrain the glass sheet in place of the first pair of clamps, the engagement of the suction cups with a surface of the glass sheet typically include a step of contacting the suction cups with the surface of the glass sheet, followed by applying a vacuum to the internal cavity of the suction cups, as is typical in industrial suction cups, to effect a firm and robust engagement therebetween. Firm and robust engagement of the suction cups to the surface of the glass sheet would allow for tensioning of the glass sheet via the glass sheet. As used herein, suction cup engagement completion time is defined as the time interval between the moment when the first suction cup touches the second major surface and the moment when all suction cups are securely engaged with the second major surface, e.g., when the internal air pressure inside all the suction cup cavities has been reduced to at most 60 kPa, in certain embodiments at most 50 kPa, in certain other embodiments at most 40 kPa. As used herein, engagement completion time of the first pair of clamps is defined as the time interval between the moment the first pair of clamps are first activated for the purpose of engagement to the moment where the clamps are firmly in contact with both the first and second major surfaces. For glass sheets with a high flexibility, i.e., glass sheets having a FXTY=LD/Th≥1000, where FXTY is flexibility, LD is the larger dimension in mm of the glass sheet of the width, measured from the end of the first side edge surface to the end of the second side edge surface, and the height, measured from the upper edge surface to the lower edge surface, and Th is the thickness of the quality area of the glass sheet in mm, the engagement of the glass sheet with the suction cups and/or the first pair of clamps is an important process parameter for process stability, and for suction cups, it can be quite long. Typically, the larger the flexibility of the glass sheet, the more likely the glass sheet is to warp across the plane, and the more likely it would take longer to engage the glass sheet with the suction cups. Thus, the process of the present disclosure is especially advantageous for bead removal of glass sheets with a FXTY≥1000, even more advantageous where FXTY≥2000, even more advantageous where FXTY≥3000, even more advantageous where FXTY≥4000, even more advantageous where FXTY≥5000, even more advantageous where FXTY≥6000, even more advantageous where FXTY≥7000, even more advantageous where FXTY≥8000, even more advantageous where FXTY≥9000, even more advantageous where FXTY≥10000. Moreover, due in part to the inclusion and implementation of step (V), the process of the present disclosure reduces the variability of the first pair of clamps engagement completion time from run to run, and the variability of clamp engagement completion time from glass sheet with one FXTY to a different glass sheet with a different FXTY. Thus, the process of the present disclosure can be used for making a large variety of glass sheet products with a large process window.

In certain embodiments of the process according to the first aspect of the present disclosure, in step (II), the first and second major surfaces in the vicinity of the upper edge surface are secured to a suspension device by using a clamp. The clamp can be affixed to an overhead glass sheet conveyor device. The clamp can be engaged with the glass sheet before the glass sheet moves into the apparatus of the present disclosure for removing the peripheral portion, and then the glass sheet is transferred into the apparatus for peripheral portion finishing. Before the engagement of the glass sheet with the first pair of clamps, the clamp securing the upper portion of the glass sheet would substantially provide the force to counteract the gravity of the glass sheet, and suspend the glass sheet in a vertical position. Alternatively, suction cups may be used to secure the upper portion of the glass sheet in place of the clamp. The location in the vicinity of the upper edge surface secured by the clamp, suction cups and the like, has a minimal distance D0 from the end of the first side edge surface.

In certain embodiments, in step (III), the first and second major surfaces in the vicinity of the first side edge surface are secured by a clamp (or suction cups or other securing devices) at a distance D1 from the end of the first side edge surface from the upper edge surface to the lower edge surface. In certain embodiments, 5 cm≤D1≤50 cm, in certain embodiments 5 cm≤D1≤40 cm, in certain embodiments 5 cm≤D1≤30 cm, in certain embodiments 5 cm≤D1≤20 cm, in certain embodiments 5 cm≤D1≤15 cm, in certain other embodiments 5≤D1≤10 cm. Normally, D1≤D0.

In certain embodiments of the process according to the first aspect of the present disclosure, step (VI) precedes step (IV), and in step (IV), a mechanical score wheel is used to press against the first major surface and form the score-line. Normally, where a mechanical score-wheel is used to form a score-line on a surface of a glass sheet, a support device such as a nosing strip on the opposing side of the glass sheet is needed to enable sufficient contact force of the score-wheel to the surface of the glass sheet and the formation of a consistent, continuous score-line on the first major surface of the glass sheet. The presence of the nosing strip is particularly beneficial when scoring glass sheets with a high FXTY. Alternatively, the score-line can be formed by a laser process, e.g., by scanning with a $CO_2$ laser followed by a cooling jet to form a vent. Where laser scoring is utilized, the back-up nosing may be unnecessary in the score-line forming process and as such, step (VII) does not necessarily precede step (IV).

While the process and apparatus according to the first and second aspects of the present disclosure are particularly advantageous for finishing glass sheets with a high flexibility FXTY as discussed above, it is particularly advantageous for finishing glass sheets with a center thickness Th(C) of at most 500 μm, in certain embodiments at most 400 μm, in certain embodiments at most 300 μm, in certain embodiments at most 200 μm, in certain embodiments at most 150 μm, in certain embodiments at most 100 μm. This is because, when the Th(C) of the glass sheet is so small, the warpage of the glass sheet along the first and second peripheral portions can be so large that engaging with suction cups becomes very difficult, rendering the use of suction cups to engage and restrain the peripheral portions impractical, while engaging with both arms of the clamps should not pose a technical challenge.

As discussed above, due to the presence of step (V) involving restraining the first peripheral portion with the first pair of clamps, the process and apparatus according to the first and second aspects of the present disclosure have the advantage of a large process window capable of finishing large glass sheet with a high flexibility. This is particularly advantageous for glass sheet with a large vertical height HT, in which direction the glass sheet can exhibit substantial warpage and difficulty in engaging with the second major surface if suction cups are used. Thus, the process and apparatus are particularly advantageous for glass sheets having a height of at least 1000 mm, in certain embodiments at least 1200 mm, in certain other embodiments at least 1500 mm, in certain other embodiments at least 1800 mm, in certain other embodiments at least 2000 mm, in certain other embodiments at least 2500 mm, in certain other embodiments at least 3000 mm.

Similarly, the process and apparatus are particularly advantageous for glass sheets with a large width WD, measured from the end of the first side edge surface to the end of the second side edge surface. Thus, the process and apparatus according to the first and second aspects of the present disclosure are particularly advantageous for finishing glass sheets having a width of at least 1000 mm, in certain embodiments at least 1200 mm, in certain other embodiments at least 1500 mm, in certain other embodiments at least 1800 mm, in certain other embodiments at least 2000 mm, in certain other embodiments at least 2500 mm, in certain other embodiments at least 3000 mm.

The process and apparatus of the present disclosure are particularly advantageous for finishing glass sheets made by down-draw processes, such as the fusion down-draw process pioneered by Corning Incorporated, Corning, N.Y. This is because in down-draw processes, the glass ribbon below the forming device, such as the isopipe and the slot, tends to undergo a temperature gradient profile leading to substantial thermal residual stress in the glass sheet produced, leading to warp in the peripheral portions defying the removal thereof in the later finishing step.

In certain embodiments of the process and apparatus according to the first and second aspects of the present disclosure, it is advantageous that the distance from the score-line to the end of the first side edge surface is D2, where $4\ cm \leq D2 \leq 40\ cm$, in certain embodiments $4\ cm \leq D2 \leq 35\ cm$, in certain embodiments $4\ cm \leq D2 \leq 30\ cm$, in certain embodiments $4\ cm \leq D2 \leq 20\ cm$, in certain embodiments $4\ cm \leq D2 \leq 15\ cm$, in certain other embodiments $4\ cm \leq D2 \leq 10$ cm. In general, it is desired that the score-line is formed at a location where the thickness of the glass sheet is substantially the same as that of the quality area of the glass sheet, thus resulting in an as-cut glass sheet at the end of the process with a substantially uniform thickness from edge to edge.

In step (V), the first pair of clamps engage the first and second major surfaces of the glass sheet. The contact location of the first pair of clamps should be between the score-line and the end of the first side edge surface, i.e., $D3<D2$. In certain embodiments, $0.5\ cm \leq D3 \leq 20\ cm$, in certain embodiments $0.5\ cm \leq D3 \leq 15\ cm$, in certain embodiments $0.5\ cm \leq D3 \leq 10\ cm$, in certain embodiments $0.5\ cm \leq D3 \leq 8\ cm$, in certain embodiments $0.5\ cm \leq D3 \leq 5\ cm$, in certain other embodiments $0.5\ cm \leq D3 \leq 3\ cm$. The actuation of the clamp can be performed by using air cylinders or hydraulic arms, linear servo motors, and the like. In one embodiment, the two sides of the first pair of clamps can be attached to a common hinge which can be activated through a single air cylinder or hydraulic arm. In another embodiment, the two sides of the first pair of clamps are each attached to a separate linear servo motor, which can be controlled to activate simultaneously or separately to push the clamp strips to enage with the first and second major surfaces of the glass sheet.

It has been found that, in certain embodiments, the pressure exerted to the first and major surfaces of the glass sheet by the first pair of clamps can be important for a successful peripheral portion removal. Specifically, if the pressure is too law, the clamps would not be able to flatten the glass sheet to a degree allowing for consistent and successful glass sheet scoring and separation. On the other hand, if the pressure is too high, the clamps would impart mechanical stress to the glass sheet to a degree detrimental for the scoring and separation operation. The control of clamp pressure on the glass sheet is especially important for glass sheets having a thickness at most 300 μm, more advantageously at most 200 μm, still more advantageously at most 150 μm. For glass sheets having a thickness of at most 300 μm, the desired range of pressure exerted by the clamps is from 200 to 2000 pascal, in certain embodiments from 300 to 1500 pascal, in certain other embodiments from 400 to 1000 pascal, in certain other embodiments from 500 tp 1000 pascal. For example, for a glass sheet having a height of about 1900 mm, when the clamp strips of the first pair of clamps have a width of about 2 mm, the desired force applied by the clamps to the the first and second major surfaces can vary from 2 pound force (4.45 newton) to about 20 pound force (44.5 newton).

It has been found that, in certain embodiments, the consistency of the pressure applied to the first and second major surfaces of the glass sheet by the first pair of clamps can be important for successful peripheral portion removal. To enable consistent pressure, the force applied to the two sides of the first pair of the clamps should be desirably consistent, and the resistance the two sides experience, e.g., through the common hinge, should be desirably consistent and low. The common hinge may comprise a bearing allowing for the relative movement of the two sides. To achieve consistent resistant in the hinge, the bearing should desirably be well lubricated all the time. Regular, periodic inspection of the bearing and lubrication thereof is conducive to consistent peripheral portion removal. In cases where the first pair of clamps are exposed to relatively high temperature, such regular maintenance is even more important.

In certain embodiments of the processes of the first aspect of the present disclosure, step (III) precedes step (V); and in other embodiments, steps (III) and (V) are carried out substantially simultaneously. Furthermore, for glass sheets with a high FXTY, especially those with a center thickness Th(C)

of at most 300 μm, it is highly desired that step (IV) is carried out after the completion of steps (III) and (V). In these desirable embodiments, the peripheral portion of the glass sheet is securely restrained when the glass sheet is being scored, substantially reducing score-wheel slippage or extraordinarily high pressing force applied by the score-wheel to the glass sheet, and significantly improving the yield of the scoring step and the overall process. Indeed, during step (IV), the first pair of clamps and the restraining means implemented in step (III) my together apply a tension to the glass sheet, such that the glass sheet between them are maintained substantially flat, thereby facilitating the successful formation of a consistent score-line. As mentioned supra, a nosing strip supporting the opposing surface is highly desired when the glass sheet is being scored. It is desired that the material directly in contact with the first and second major surfaces have sufficient rigidity so that the glass sheet does not undergo appreciable shape change when being finished. Thus, the material of the nosing strip and the part of the clamps directly contacting the first and/or second major surfaces can be selected from metals, such as aluminum, stainless steel, and the like, or hard, durable plastic or rubber materials, such as hard silicone rubber material.

A second aspect of the present disclosure is an apparatus for use in carrying out certain embodiments of the process according to the first aspect of the present disclosure. The apparatus advantageously comprises:

(A) a glass suspension device adapted for placing the glass sheet in a vertical position by securing the first and second major surfaces in the vicinity of the upper edge surface;

(B) a first edge restraining tower located on the side of the first major surface comprising a first edge restraining clamp strip, and a second edge restraining tower located on the side of the second major surface comprising a second edge restraining clamp strip, the distance between the first edge restraining clamp strip and the second edge restraining clamp strip being adjustable and adapted for restraining the first and second major surfaces in the vicinity of the first side edge at a distance D1 from the end of the first side edge surface from the upper edge surface to the lower edge surface;

(C) a mechanical scoring wheel installed on the first edge restraining tower adapted for vertical motion in contact with the first major surface to form a score-line on the first major surface extending from the vicinity of the upper edge surface to the lower edge surface at a distance from the end of the first side edge surface D2, where D2<D1;

(D) a first pair of edge clamps adapted for engaging and clamping the first and second major surfaces of the first peripheral portion at a distance from the end of the first side edge surface D3, where D3<D2;

(E) a nosing strip opposing the score-line adapted for contacting the second major surface; and (F) a force applicator adapted for pulling the second major surface in a direction away from the first major surface by the first vertical pair of clamps, such that the first peripheral portion of the glass sheet in the vicinity of the first side edge bends against the nosing strip, and separates along the score-line from the center region of the glass sheet.

In certain advantageous embodiments of the apparatus according to the second aspect of the present disclosure, the nosing strip has a Shore A hardness not lower than the glass sheet. The high hardness of the nosing strip prevents the glass sheet from excessive local deformation when pressed by a mechanical score-wheel, thereby enabling the consistent formation of score-line with consistent vent depth and without loss of touch of the score-wheel with the surface of the glass sheet and thereby loss of vent. A continuous score-line with substantially uniform vent depth extending from the vicinity of the upper edge surface to the vicinity of the lower edge surface is beneficial for the separation of the peripheral portion in step (VII) without creating sharp edges, excessive glass chips, non-straight edge and other undesired features. To that end, the nosing strip material directly contacting the first major surface of the glass sheet can be selected from a metal, such as aluminum and alloys thereof, stainless steel, and hard plastic and rubber materials with the desired temperature capability and hardness. Furthermore, it is desired that the nosing strip is supported by a seat that is sufficiently rigid such that the nosing strip remains substantially linear when the score wheel presses the first major surface of the glass against the nosing strip.

The present invention is further illustrated by the following non-limiting examples.

EXAMPLES

Example 1 (Inventive)

Figure 2:
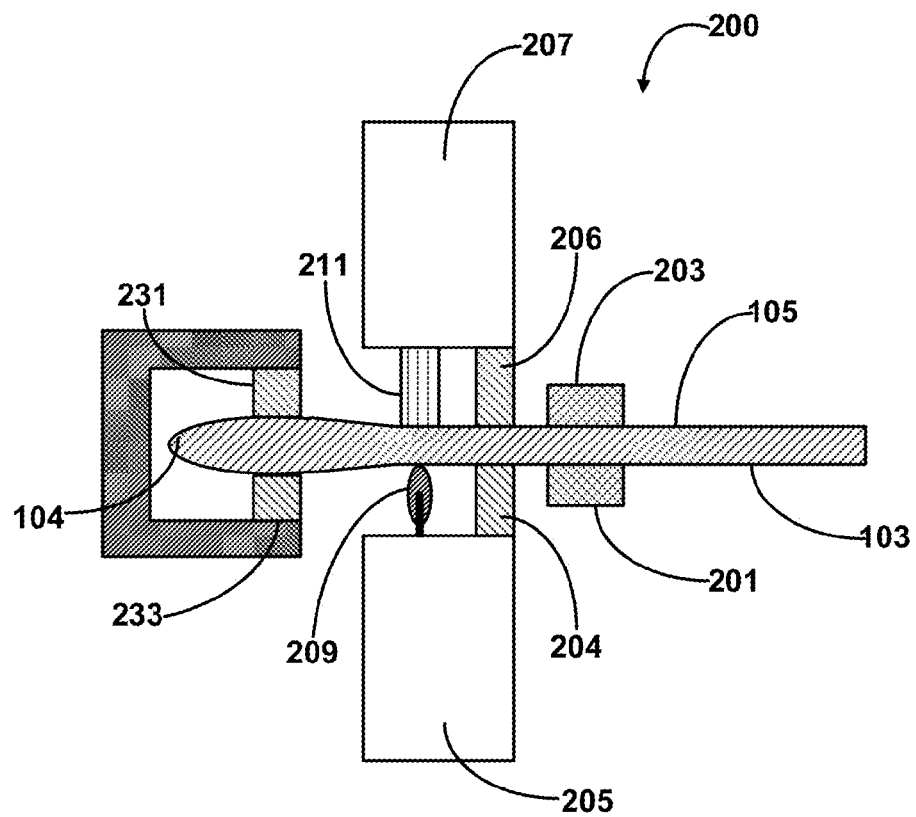
FIG. 2 is a schematic illustration of an apparatus according to one embodiment of the present disclosure using a first pair of clamps for removing a first peripheral portion of a glass sheet.
Figure 2:
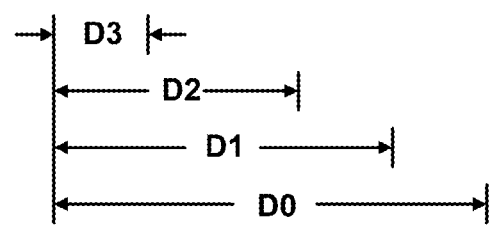

FIG. 2 schematically illustrates a cross-sectional view of one end of a glass sheet bead removing apparatus 200 in operation according to certain embodiments of the first and second aspects of the present disclosure. The other end, substantially symmetrical to the end illustrated, is not shown. The glass sheet shown in FIGS. 1A and 1B is being secured by the two clamping arms 201, 203 of a clamp affixed to a suspension device (not shown) such as a vertical glass sheet suspension conveyor. Normally, the glass sheet is first engaged with the clamping arms 201 and 203 outside of the peripheral portion removing apparatus 200, and then moved into the apparatus 200 by the conveyor. Inside the peripheral portion removing apparatus 200, a first side edge restraining tower 205 comprising a first side edge restraining clamp strip 204 is located on the side of the first major surface 103 of the glass sheet, and a second side edge retraining tower 207 comprising a second side edge restraining clamp strip 206 is located on the side of the second major surface 105 of the glass sheet. Thus, during operation, the first and second side edge restraining clamp strips 204 and 206 move towards each other once the glass sheet is positioned inside the apparatus 200, engage the glass sheet, restrain the portion of the glass sheet close to the beaded region, and secure the glass sheet to enable the following steps. A first pair of clamps 231 and 233 is then activated to engage the second and first major surfaces of the glass sheet at a location with a distance D3 from the end of the first side edge surface. The engagement of the clamping towers 205 and 207 as well as the first pair of clamps 231 and 233 can be completed within a very short period of time. Once the glass sheet is clamped by the restraining towers 205 and 207 and the first pair of clamps 231 and 233, a score-wheel 209, installed on the first side edge restraining tower 205, touches the first major surface 103 of the glass sheet at a location in the vicinity of the upper edge surface, but does not directly touch the very edge line of the upper edge surface. Backed by a nosing strip 211, installed on the second side edge restraining tower 207 and extending from the upper edge surface to the lower edge surface, the score-wheel forms a score-line extending from the vicinity of the upper edge surface to the vicinity of the lower edge surface by scoring from the top to the bottom of the glass sheet. Once scoring is completed, the score-wheel is retracted from the first major surface. Thereafter, the first pair of clamps, while being engaged, is activated to push the first peripheral portion of the glass sheet in a direction from the first major surface to the second major surface, while the glass sheet rests on the nosing strip on the second major surface. The resultant stress, when increasing to a threshold level, will cause the peripheral portion to break along the score-line. Thereafter, the first pair of clamps 231 and 233 can be released from the separated piece of glass, leaving the separated peripheral portion to drop to the floor or a collector below the apparatus. Alternatively, the first pair of clamps 231 and 233 may be actuated such that they transfer the broken peripheral portion to another location, where they are disengaged to release the broken peripheral portion safely.

An experiment using this apparatus 200 achieved at least 85% of yield when processing a glass sheet having a thickness of 300 μm for bead removal.

Example 2 (Comparative)

Figure 3:
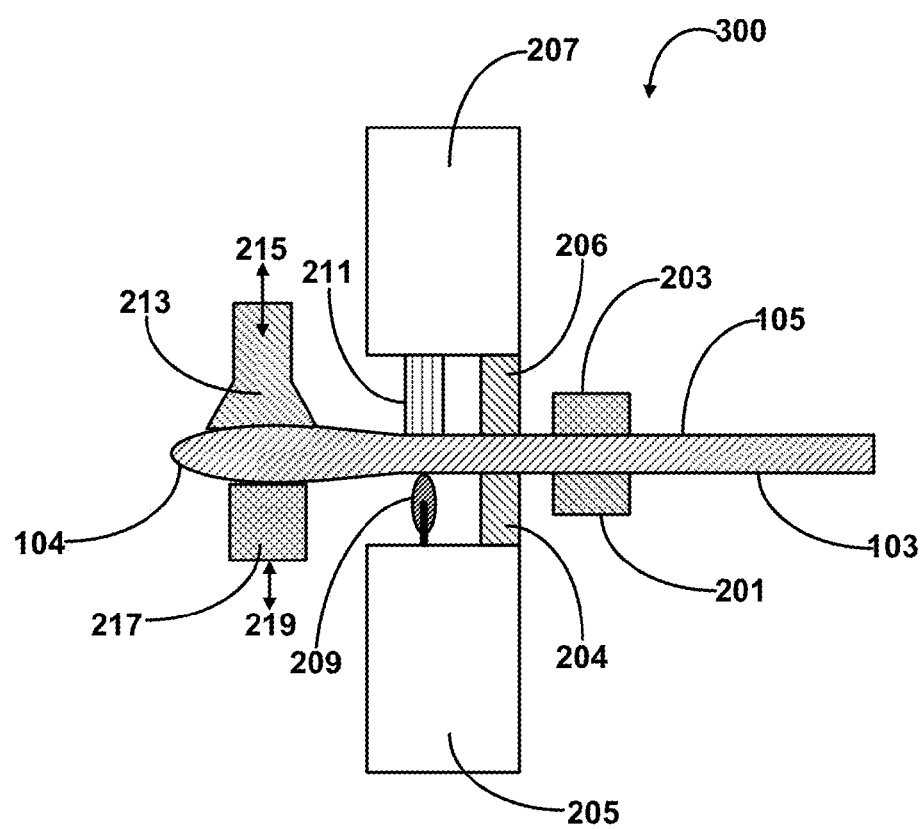
FIG. 3 is a schematic illustration of an apparatus in a comparative example using a pushing bar together suction cups for removing a peripheral portion of a glass sheet.
Figure 3:
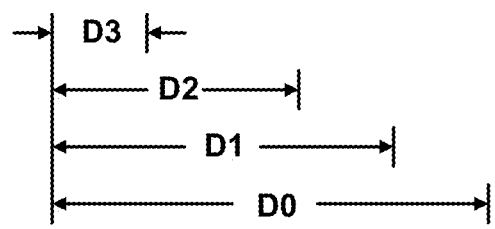

FIG. 3 schematically illustrates a cross-sectional view of one end of a glass sheet bead removing apparatus 200 in operation according to a comparative example. The other end, substantially symmetrical to the end shown, is not shown. In this comparative example, the glass sheet shown in FIG. 1 is being secured by the two clamping arms 201, 203 of a clamp affixed to a suspension device (not shown) such as a vertical glass sheet suspension conveyor. Normally, the glass sheet is first engaged with the clamping arms 201 and 203 outside of the peripheral portion removing apparatus 200, and is then moved into the apparatus 200 by the conveyor. Inside the peripheral portion removing apparatus 200, a first side edge restraining tower 205 comprising a first side edge restraining clamp strip 204 is located on the side of the first major surface 103 of the glass sheet, and a second side edge retraining tower 207 comprising a second side edge restraining clamp strip 206 is located on the side of the second major surface 105 of the glass sheet. Thus, during operation, the first and second side edge restraining clamp strips 204 and 206 move towards each other once the glass sheet is positioned inside the apparatus 200, engage the glass sheet, restrain the portion of the glass sheet close to the beaded region, and secure the glass sheet to enable the following steps. Once the glass sheet is clamped on both sides by the restraining towers (only one side shown in this figure), a score-wheel 209, installed on the first side edge restraining tower 205, touches the first major surface 103 of the glass sheet at a location in the vicinity of the upper edge surface, but does not directly touch the very edge line of the upper edge surface. Backed by a nosing strip 211, installed on the second side edge restraining tower 207 and extending from the upper edge surface to the lower edge surface, the score-wheel forms a score-line extending from the vicinity of the upper edge surface to the vicinity of the lower edge surface by scoring from the top to the bottom of the glass sheet. Once scoring is completed, the score-wheel is retracted from the first major surface. A straight pushing bar 217 then advances in the direction 219 towards the first major surface of the glass sheet, contacts the peripheral portion of the glass sheet, and pushes the first major surface of the peripheral portion towards the second major surface of the glass sheet. In the mean time, a series of suction cups 213 (only one shown) advance towards the second major surface 105 and engage the side of the second major surface of the peripheral portion of the glass sheet. Due to the collaboration between the pushing bar 217 and the suction cups 213, the time for completing the engagement of the suction cups with the second major surface of the glass sheet is reduced compared to the embodiment in the comparative example illustrated in FIG. 4 and described below. Once the suction cups are firmly engaged to the second major surface of the glass sheet, the peripheral portion of the glass sheet is then pulled by the suction cups in the direction from the first major surface to the second major surface. The pushing bar 217 may retract immediately after the completion of the engagement of the suction cups to the second major surface without further pushing the glass sheet, or, alternatively, it can continue to push the glass sheet together with the suction cups. When the pushing reaches a threshold level, the peripheral portion, including the beaded region, separates along the score-line. Afterwards, the suction cups disengage with the second major surface of the glass sheet, releasing the removed peripheral portions to the glass chard collector down below. The first and second restraining clamp strips 204 and 206 of the restraining towers then move away from each other, releasing the two side portions of the remaining quality area. The quality portion of the glass sheet is then moved out of the peripheral portion removing apparatus 200 by the suspension conveyor to the next process step, such as edge finishing, washing, cleaning, and the like.

An experiment using this apparatus 300 achieved 46% of yield when processing a glass sheet having a thickness of 300 μm for bead removal.

Example 3 (Comparative)

Figure 4:
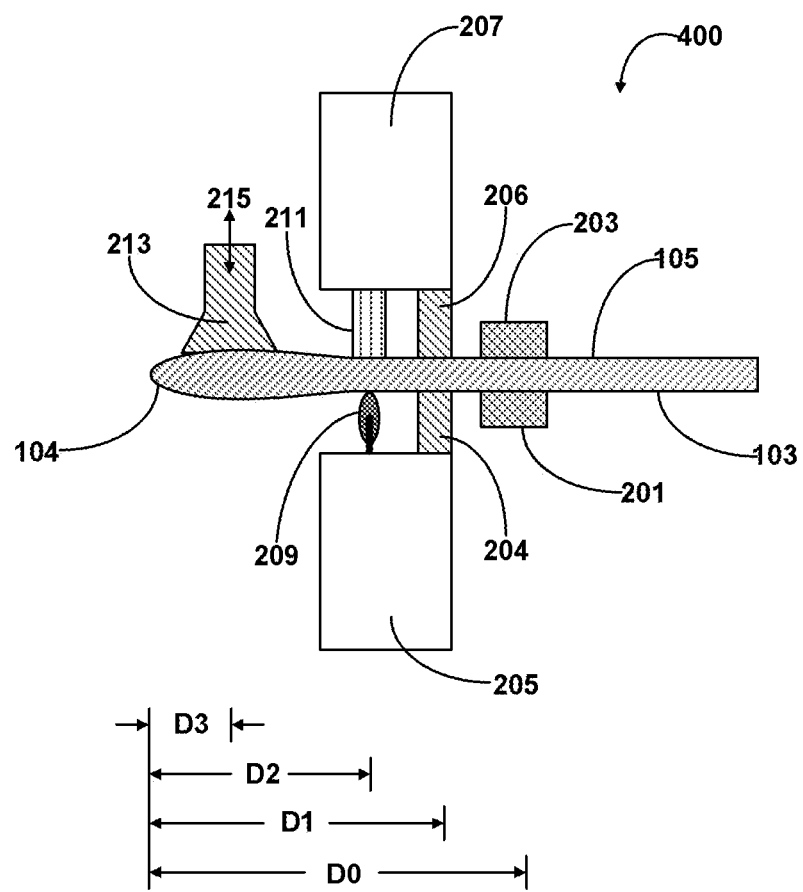
FIG. 4 is a schematic illustration of an apparatus in another comparative example using suction cups only for removing a peripheral portion of a glass sheet.

FIG. 4 schematically illustrates a cross-sectional view of one end of a glass sheet peripheral portion removing apparatus 400 in operation, as a comparative example. The other end, being symmetrical, is not shown. As can be seen, compared to the apparatus 300 of FIG. 3, the apparatus 400 does not comprise the pushing bar 217. While this simplified apparatus 400 can be used for peripheral portion removal of glass sheets with relatively large thickness Th(C) of at least 500 μm, such as those at 600 μm and 700 μm, the cycle time of the bead removal process is longer than required for the apparatus 200 and 300 described supra due to longer time required for completing suction cup engagement.

An experiment using this apparatus 400 achieved 30% of yield when processing a glass sheet having a thickness of 300 μm for bead removal.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A process for removing a first peripheral portion of a glass sheet, the process comprising steps of:
   (I) providing a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion is in a vicinity of the first side edge surface;
   (II) placing the glass sheet in a predetermined position by securing the first and second major surfaces in a vicinity of the upper edge surface to a suspension device;
   (III) after step (II), restraining the first and second major surfaces in a vicinity of the first side edge surface at a distance D1 from an end of the first side edge surface extending from the upper edge surface to the lower edge surface;
   (IV) after step (III), forming a score-line on the first major surface extending from a vicinity of the upper edge surface to a vicinity of the lower edge surface at a distance D2 from the end of the first side edge surface, where D2<D1;

(V) clamping the first and second major surfaces in a vicinity of the first side edge surface at a distance D3 from the end of the first side edge surface using a first pair of clamps, where D3<D2;

(VI) contacting the second major surface with a nosing strip opposing the score-line;

(VII) after steps (V) and (VI), activating the first pair of clamps to push the first peripheral portion of the glass sheet in a direction from the first major surface to the second major surface such that the first peripheral portion of the glass sheet bends against the nosing strip and separates along the score-line from the center region of the glass sheet.

2. A process according to claim 1, wherein in step (I), the first peripheral portion of the glass sheet as provided is warped in a direction from the upper edge surface to the lower edge surface when the glass sheet has a substantially uniform temperature at room temperature and is not subjected to external force.

3. A process according to claim 1, wherein in step (V), the engagement of the first pair of clamps to the first major surface and the second major surface of the first peripheral portion is completed in at most 1.5 seconds.

4. A process according to claim 1, wherein in step (II), the first and second major surfaces in the vicinity of the upper edge surface are secured to the suspension device by using clamps.

5. A process according to claim 1, wherein in step (III), the first and second major surfaces in the vicinity of the first side edge surface are secured by a second pair of clamps at the distance D1 from the end of the first side edge surface.

6. A process according to claim 5, wherein the second pair of clamps extend from the upper edge surface to the lower edge surface.

7. A process according to claim 1, wherein step (VI) precedes step (IV), and in step (IV), a mechanical score wheel is used to press against the first major surface and form the score-line.

8. A process according to claim 1, wherein in step (I), the center thickness Th(C) of the glass sheet is at most 500 μm.

9. A process according to claim 8, wherein in step (I), the glass sheet has a height of at least 1000 cm.

10. A process according to claim 8, wherein in step (I), the glass sheet has a width of at least 1000 cm.

11. A process according to claim 1, wherein the glass sheet is made by a down-draw process.

12. A process according to claim 1, wherein 5 cm≤D1≤50 cm.

13. A process according to claim 1, wherein 4 cm≤D2≤40 cm.

14. A process according to claim 1, wherein 0.5 cm≤D3≤20 cm.

15. A process according to claim 1, wherein in step (V), the first pair of clamps extends from the upper edge surface to the lower edge surface.

16. A process according to claim 1, wherein in step (V), the first pair of clamps exert a pressure to the first and second major surfaces ranging from 200 to 2000 pascal.

17. A process according to claim 1, wherein in step (VI), the nosing strip has a hardness not lower than the glass sheet.

18. A process according to claim 17, wherein step (VI) precedes step (IV), and wherein in step (VI) the nosing strip is mounted on a support that is sufficiently rigid such that during step (IV) the nosing strip remains substantially linear when a score wheel used to form the score-line presses the first major surface of the glass sheet against the nosing strip.

19. An apparatus configured to remove a first peripheral portion of a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion is in a vicinity of the first side edge surface, the apparatus comprising:

(A) a glass suspension device configured to place the glass sheet in a vertical position by securing the first and second major surfaces in a vicinity of the upper edge surface;

(B) a first edge restraining tower located on a side of the first major surface comprising a first edge restraining clamp strip, and a second edge restraining tower located on a side of the second major surface comprising a second edge restraining clamp strip, wherein a distance between the first edge restraining clamp strip and the second edge restraining clamp strip being adjustable and adapted so the first edge restraining clamp strip and the second edge restraining clamp strip restrain the first and second major surfaces in a vicinity of the first side edge surface at a distance D1 from an end of the first side edge surface from the upper edge surface to the lower edge surface;

(C) a mechanical scoring wheel installed on the first edge restraining tower, where the scoring wheel is configured to be moved in a vertical direction while contacting the first major surface to form a score-line on the first major surface extending from a vicinity of the upper edge surface to the lower edge surface at a distance D2 from the end of the first side edge surface, where D2<D1;

(D) a first pair of clamps configured to engage and clamp the first and second major surfaces in a vicinity of the first side edge surface at a distance D3 from the end of the first side edge surface, where D3<D2;

(E) a nosing strip opposing the score-line configured to contact the second major surface; and (F) a force applicator configured to activate the first pair of clamps to push the first peripheral portion of the glass sheet in a direction from the first major surface to the second major surface such that the first peripheral portion of the glass sheet bends against the nosing strip and separates along the score-line from the center region of the glass sheet.

20. An apparatus according to claim 19, wherein the nosing strip has a hardness not lower than the glass sheet.

21. An apparatus according to claim 20, wherein the nosing strip is supported by a seat that is sufficiently rigid such that the nosing strip remains substantially linear when the scoring wheel presses the first major surface of the glass sheet against the nosing strip.

* * * * *